(12) United States Patent
Yeh

(10) Patent No.: US 11,221,080 B1
(45) Date of Patent: Jan. 11, 2022

(54) WALL-MOUNTED FAUCET

(71) Applicant: Ta-Yu Yeh, Changhua (TW)

(72) Inventor: Ta-Yu Yeh, Changhua (TW)

( * ) Notice: Subject to any disclaimer, the term of this patent is extended or adjusted under 35 U.S.C. 154(b) by 7 days.

(21) Appl. No.: 16/912,449

(22) Filed: Jun. 25, 2020

(51) Int. Cl.
*F16K 11/078* (2006.01)
*F16K 31/60* (2006.01)

(52) U.S. Cl.
CPC ........ *F16K 11/0787* (2013.01); *F16K 31/605* (2013.01); *Y10T 137/86549* (2015.04)

(58) Field of Classification Search
CPC ............... F16K 11/0787; F16K 31/605; Y10T 137/86549
See application file for complete search history.

(56) References Cited

U.S. PATENT DOCUMENTS

| | | | | |
|---|---|---|---|---|
| 2013/0019708 A1* | 1/2013 | Huang | ................. | F16K 31/605 74/490.12 |
| 2013/0020518 A1* | 1/2013 | Huang | ................. | F16K 31/605 251/213 |
| 2013/0036854 A1* | 2/2013 | Huang | ................. | F16K 31/605 74/543 |
| 2013/0036855 A1* | 2/2013 | Huang | ................. | F16K 31/605 74/543 |
| 2013/0036857 A1* | 2/2013 | Huang | ................... | F16K 31/60 74/543 |
| 2013/0068063 A1* | 3/2013 | Huang | ................. | F16K 31/605 74/543 |

* cited by examiner

*Primary Examiner* — Kevin R Barss
(74) *Attorney, Agent, or Firm* — Che-Yang Chen; Law Office of Michael Chen

(57) ABSTRACT

A wall-mounted faucet may include a control handle, five adapters, a positioning member, and a panel set. The panel set has different adjusting pieces and locating sleeves to be selected such that the wall-mounted faucet can be applied to different sizes of control valves through different of the adapters, the adjusting pieces, and the locating sleeves. Also, the panel set has a plurality of locking points and locking boards, which increases the convenience for assembly.

9 Claims, 14 Drawing Sheets

WALL-MOUNTED FAUCET

FIELD OF THE INVENTION

The present invention relates to a faucet and more particularly to a wall-mounted faucet that can be applied to different sizes of water control valves.

BACKGROUND OF THE INVENTION

With the popularity of DIY in recent years, people pay more attention to the appearance of faucet, so that people start trying to replace the control handle and the panel set of the faucet by themselves to get rid of old appearance of the faucet.

However, the conventional wall-mounted faucet has following disadvantages: different faucets have different sizes of control handles and panel sets such that it is not easy for customers to purchase the suitable faucet handle and panel set. Therefore, there remains a need for a new and improved design for a wall-mounted faucet to overcome the problems presented above.

SUMMARY OF THE INVENTION

The present invention provides a wall-mounted faucet comprising a control handle, a first adapter, a second adapter, a third adapter, a fourth adapter, a fifth adapter, a positioning member, and a panel set. A lateral side of the control handle is concaved to form a spacing therein, and four engaging boards are respectively extended from the center of the spacing toward four directions to form an engaging slot. A connecting block having a first through hole thereon protrudes from an inner periphery of the spacing, and a first locking piece is screwed into the first through hole. One of the first adapter, the second adapter, the third adapter, the fourth adapter, and the fifth adapter, is selected to position into the spacing of the control handle. Each of the five adapters comprises a connecting slot at a rear end thereof while a front end thereof has a first abutting surface, and each of the five adapters has a first connecting hole at a bottom portion thereof adjacent to the first abutting surface. The first abutting surface comprises a second through hole thereon which is communicated with the connecting slot, and a second locking piece is screwed into the second through hole. The first adapter comprises a wing portion protruding from a middle portion of the first adapter, and a first blocking rib is extendedly formed from the wing portion near the top of the connecting slot, and the connecting slot is adapted to receive a washer. The second adapter has two wing portions respectively protruding from two lateral lower portions of a middle portion of the second adapter, and two blocking columns are extendedly formed from the two wing portions respectively on both sides of the connecting slot at corresponding positions. Each of the fourth adapter and the fifth adapter has a locking hole under the connecting slot, and a bolt is screwed into the locking hole. An inner periphery of the connecting slot of the fourth adapter has a circular cross section, and an inner periphery of the connecting slot of the fifth adapter has a polygonal cross section while an outer periphery thereof has a plane on the top thereof. The positioning member has a first sleeve and a locating piece, and an engaging rib protrudes from an outer periphery of the first sleeve while an inner periphery of the first sleeve has a first gear teeth, and a front end of the first sleeve comprises an abutting board. A second gear teeth formed on an outer periphery of a rear end of the locating piece is adapted to engage with the first gear teeth of the first sleeve. A front end of the locating piece is expanded to form a second abutting surface which is configured to abut against an opening of the front end of the first sleeve. A blocking portion protruding from an edge of the second abutting surface is adapted to abut against the first blocking rib of the first adapter. The panel set comprises a connecting panel, a first adjusting piece, and a second adjusting piece, and the connecting panel is configured to connect to a wall surface, and a first gasket is coupled therebetween to connect the connecting panel to the wall surface tightly. A receiving slot is concavely formed at a front end of the connecting panel, and a bottom surface of the receiving slot has a hollow opening, and a plurality of locking points are formed on the bottom surface around the hollow opening. A plurality of locking boards respectively protrude from an inner periphery of the hollow opening, and each of the locking boards has at least a locking groove formed thereon. The locations of the locking points and the locking boards are arranged according to the size of a control valve of the wall-mounted faucet. The connecting panel comprises a third through hole formed near an outer periphery of the connecting panel, and both sides of the third through hole respectively have a cover and a second gasket. One of the first adjusting piece and the second adjusting piece is selected to connect to the receiving slot of the connecting panel, and a third gasket is coupled therebetween to assure tight sealing. Each of the first adjusting piece and the second adjusting piece comprises a second connecting hole which is configured to be penetrated through by the valve body of the control valve, and the second connecting hole is different in size for the first adjusting piece and the second adjusting piece so as to fit different sizes of the control valves. The second connecting hole of the first adjusting piece is adapted to selectively couple with one of two different hole-sizes of first locating sleeves, and each of the first locating sleeves has an axial second blocking rib protruding from an outer periphery thereof. The second connecting hole of the second adjusting piece is configured to selectively couple with one of a second locating sleeve and a third locating sleeve, and the second locating sleeve has a first connecting section at an end thereof, and the third locating sleeve comprises a first locking member and a second locking member. A first inner thread and a second inner thread are formed on an inner periphery of the first locking member respectively at two different sections thereof, and an outer periphery of the second locking member comprises an outer thread. One of the first locating sleeves, the second locating sleeve, and the third locating sleeve is selected to connect to the valve body of the control valve.

Comparing with conventional wall-mounted faucet, the present invention is advantageous because: the wall-mounted faucet of the present invention can be applied to different sizes of the control valves through selecting the adapters, the adjusting pieces, and the locating sleeves, and also the panel set has the locking points and the locking boards, which increases the convenience for assembly.

DETAILED DESCRIPTION OF THE INVENTION

Figure 1:
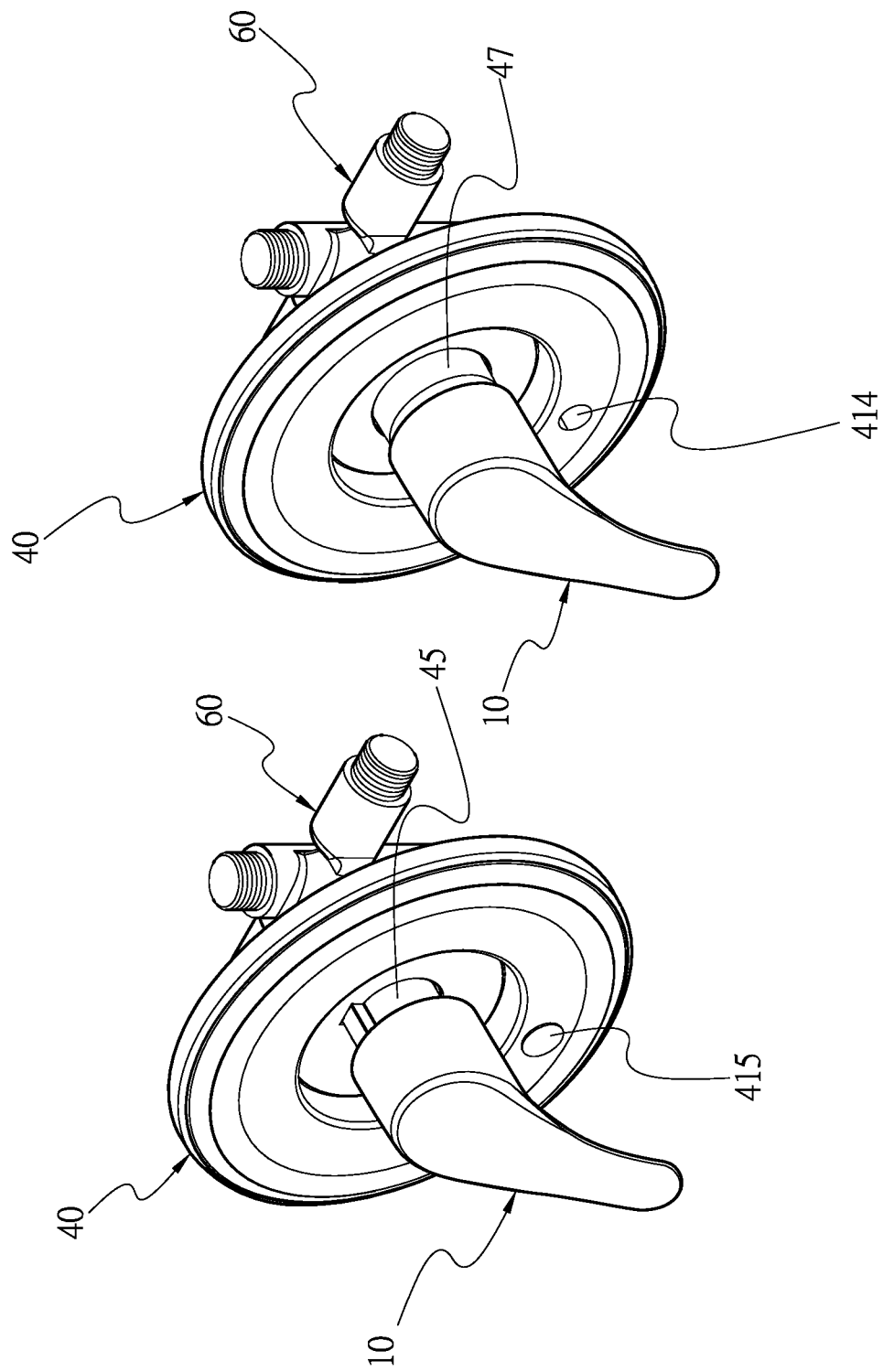
FIG. 1 is a three-dimensional assembly view of two embodiments of wall-mounted faucets of the present invention.

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

In order to further understand the goal, characteristics and effect of the present invention, a number of embodiments along with the drawings are illustrated as following:

Referring to FIGS. 1 to 5, the present invention provides a wall-mounted faucet comprising a control handle (10), a first adapter (20a), a second adapter (20b), a third adapter (20c), a fourth adapter (20d), a fifth adapter (20e), a positioning member (30), and a panel set (40). A lateral side of the control handle (10) is concaved to form a spacing (11) therein, and four engaging boards (12) are respectively extended from the center of the spacing (11) toward four directions to form an engaging slot (13). A connecting block (14) having a first through hole (141) thereon protrudes from an inner periphery of the spacing (11), and a first locking piece (142) is screwed into the first through hole (141). One of the first adapter (20a), the second adapter (20b), the third adapter (20c), the fourth adapter (20d), and the fifth adapter (20e), is selected to position into the spacing (11) of the control handle (10). Each of the first adapter (20a), the second adapter (20b), the third adapter (20c), the fourth adapter (20d), and the fifth adapter (20e), comprises a connecting slot (21) at a rear end thereof while a front end thereof has a first abutting surface (22), and each of the five adapters (20a)(20b)(20c)(20d)(20e) has a first connecting hole (23) at a bottom portion thereof adjacent to the first abutting surface (22). The first abutting surface (22) comprises a second through hole (24) thereon which is communicated with the connecting slot (21), and a second locking piece (241) is screwed into the second through hole (24). The first adapter (20a) comprises a wing portion protruding from a middle portion of the first adapter (20a), and a first blocking rib (25) is extendedly formed from the wing portion near the top of the connecting slot (21), and the connecting slot (21) is adapted to receive a washer (211). The second adapter (20b) has two wing portions respectively protruding from two lateral lower portions of a middle portion of the second adapter (20b), and two blocking columns (26) are extendedly formed from the two wing portions respectively on both sides of the connecting slot (21) at corresponding positions. Each of the fourth adapter (20d) and the fifth adapter (20e) has a locking hole (27) under the connecting slot (21), and a bolt (271) is screwed into the locking hole (27). An inner periphery of the connecting slot (21) of the fourth adapter (20d) has a circular cross section. Moreover, an inner periphery of the connecting slot (21) of the fifth adapter (20e) has a polygonal cross section while an outer periphery thereof has a plane on the top thereof. The positioning member (30) has a first sleeve (31) and a locating piece (32), and an engaging rib (311) protrudes from an outer periphery of the first sleeve (31) while an inner periphery of the first sleeve (31) has a first gear teeth (312), and a front end of the first sleeve (31) comprises an abutting board (313). A second gear teeth (321) formed on an outer periphery of a rear end of the locating piece (32) is adapted to engage with the first gear teeth (312) of the first sleeve (31). Furthermore, a front end of the locating piece (32) is expanded to form a second abutting surface (322) which is configured to abut against an opening of the front end of the first sleeve (31). In addition, a blocking portion (323) protruding from an edge of the second abutting surface (322) is adapted to abut against the first blocking rib (25) of the first adapter (20a). The panel set (40) comprises a connecting panel (41), a first adjusting piece (42), and a second adjusting piece (43), and the connecting panel (41) is configured to connect to a wall surface (50), and a first gasket (411) is coupled therebetween to connect the connecting panel (41) to the wall surface (50) tightly. A receiving slot (412) is concavely formed at a front end of the connecting panel (41), and a bottom surface of the receiving slot (412) has a hollow opening (413), and a plurality of locking points (4121) are formed on the bottom surface around the hollow opening (413). Also, a plurality of locking boards (4131) respectively protrude from an inner periphery of the hollow opening (413), and each of the locking boards (4131) has at least a locking groove (4132) formed thereon. The locations of the locking points (4121) and the locking boards (4131) are arranged according to the size of a control valve (60) of the wall-mounted faucet. Moreover, the connecting panel (41) comprises a third through hole (414) formed near an outer periphery of the connecting panel (41), and both sides of the third through hole (414) respectively have a cover (415) and a second gasket (416). One of the first adjusting piece (42) and the second adjusting piece (43) is selected to connect to the receiving slot (412) of the connecting panel (41), and a third gasket (417) is coupled therebetween to assure tight sealing. Each of the first adjusting piece (42) and the second adjusting piece (43) comprises a second connecting hole (44) which is configured to be penetrated through by the valve body of the control valve (60), and the second connecting hole (44) is different in size for the first adjusting piece (42) and the second adjusting piece (43) so as to fit different sizes of the control valves (60). Furthermore, the second connecting hole (44) of the first adjusting piece (42) is adapted to selectively couple with one of two different hole-sizes of first locating sleeves (45), and each of the first locating sleeves (45) has an axial second blocking rib (451) protruding from an outer periphery thereof. The second connecting hole (44) of the second adjusting piece (43) is configured to selectively couple with one of a second locating sleeve (46) and a third locating sleeve (47), and the second locating sleeve (46) has a first connecting section (461) at an end thereof, and the third locating sleeve (47) comprises a first locking member (471) and a second locking member (472). Also, a first inner thread (4711) and a second inner thread (4712) are formed on an inner periphery of the first locking member (471) respectively at two different sections thereof, and an outer periphery of the second locking member (472) comprises an outer thread (4721). One of the first locating sleeves (45), the second locating sleeve (46), and the third locating sleeve (47) is selected to connect to the valve body of the control valve (60).

Figure 2:
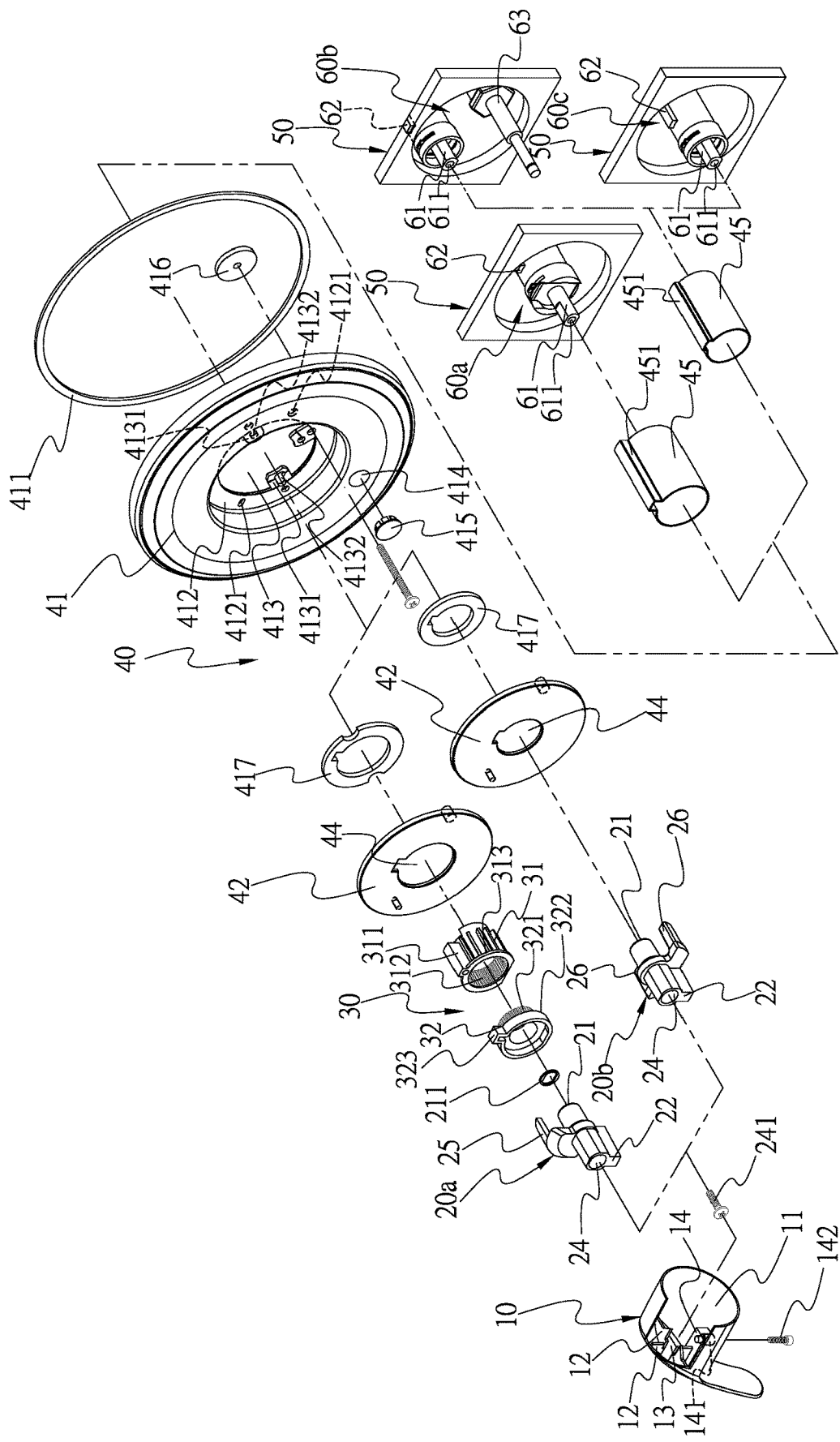
FIG. 2 is a three-dimensional exploded view of the first embodiment of the wall-mounted faucet of the present invention.
Figure 3:
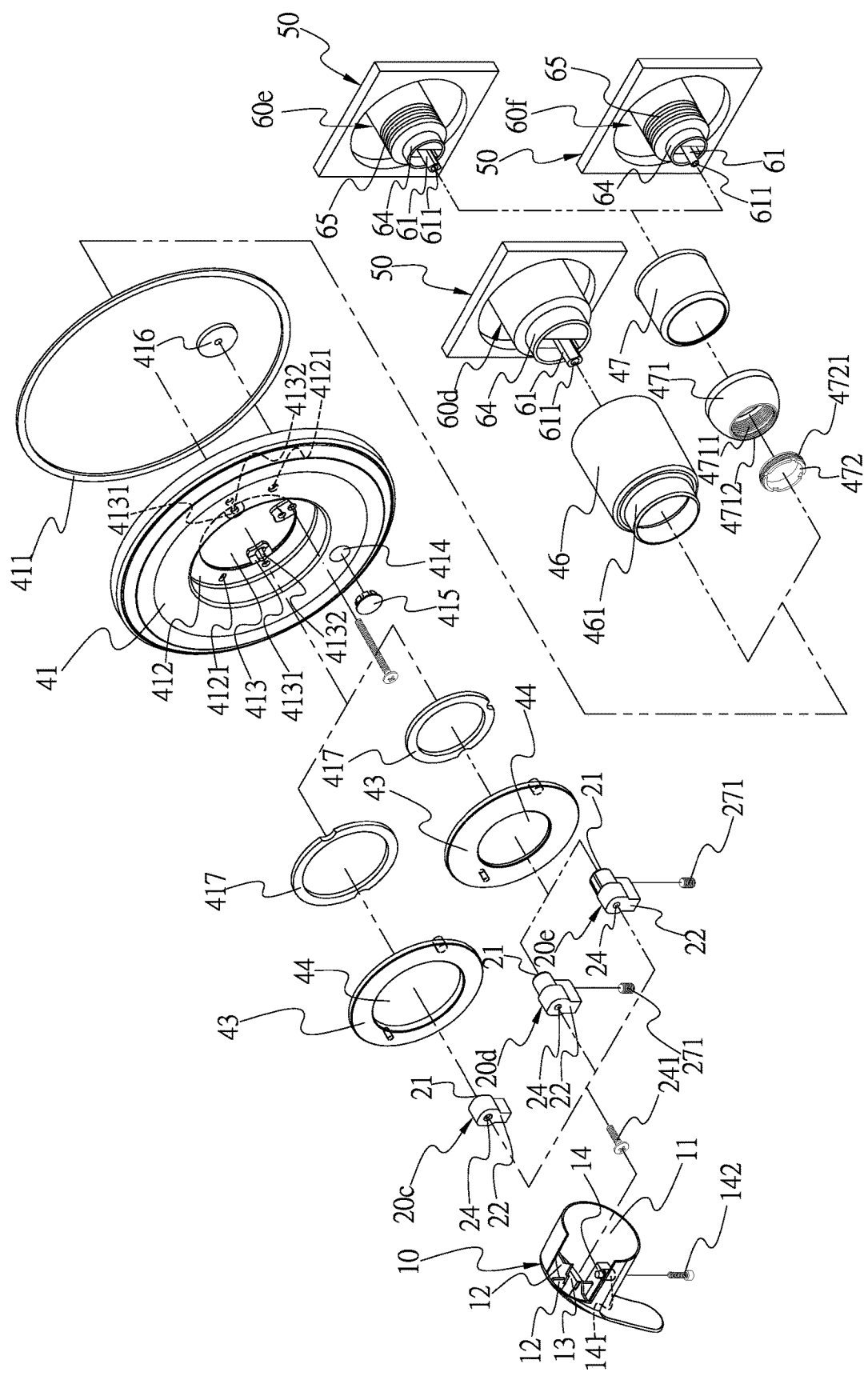
FIG. 3 is a three-dimensional exploded view of the second embodiment of the wall-mounted faucet of the present invention.

In actual application, referring to FIGS. 2 and 3, the wall-mounted faucet of the present invention is configured to connect to one of different sizes of the control valves (60) including a first control valve (60a), a second control valve (60b), a third control valve (60c), a fourth control valve (60d), a fifth control valve (60e), and a sixth control valve (60f), the control valve (60) has a valve rod (61) protruding therefrom, and a third connecting hole (611) is formed on the valve rod (61). Excepting the fifth control valve (60e) and the sixth control valve (60f), each of the four valve rods (61) of the other four control valves (60a)(60b)(60c)(60d) has two planes on an outer periphery thereof at corresponding positions. Moreover, each of the first control valve (60a), the second control valve (60b), and the third control valve (60c) comprises an axial blocking protrude (62) on an outer periphery thereof. The second control valve (60b) has a switching rod (63) protrudingly formed under the valve rod (61). Each of the fourth control valve (60d), the fifth control valve (60e), and the sixth control valve (60f) comprises a second connecting section (64) at an outer end thereof, and each of the fifth control valve (60e) and the sixth control valve (60f) has a thread section (65) on an outer periphery thereof near the second connecting section (64). Additionally, the valve rod (61) of the fifth control valve (60e) has a polygonal cross section while the valve rod (61) of the sixth control valve (60f) has a circular cross section.

Referring to FIGS. 2, and 4 to 9, when the control handle (10) is connected to the first control valve (60a), the first locating sleeve (45) with larger size is disposed on the valve body of the first control valve (60a), and the second blocking rib (451) of the first locating sleeve (45) is engaged with the blocking protrude (62) of the first control valve (60a). Moreover, the engaging rib (311) of the first sleeve (31) of the positioning member (30) is slidably coupled in the second blocking rib (451) of the first locating sleeve (45), and the abutting board (313) of the first sleeve (31) is abutted against an edge of a front opening of the first locating sleeve (45), and the second gear teeth (321) of the locating piece (32) is engaged with the first gear teeth (312) of the first sleeve (31). Also, the connecting panel (41) is disposed on the outer periphery of the first control valve (60a) through the hollow opening (413), and the first adjusting piece (42) with larger size is connected to the receiving slot (412) of the connecting panel (41), so that the connecting panel (41) is applied to the first control valve (60a) with larger size. Furthermore, the connecting panel (41) is mounted on the wall surface (50) through the locking points (4121) of the receiving slot (412) and/or the locating boards (4131) of the hollow opening (413) so as to complete the assembly of the panel set (40). In addition, the connecting slot (21) of the first adapter (20a) is disposed on the valve rod (61) of the first control valve (60a), and the second locking piece (241) passes through the second through hole (24) to lock into the third connecting hole (611) of the first control valve (60a). Also, the spacing (11) of the control handle (10) is disposed on the first adapter (20a), and the first abutting surface (22) of the first adapter (20a) is slidably positioned in the engaging slot (13) of the control handle (10) to abut against the engaging boards (12). Moreover, the first through hole (141) of the connecting block (14) of the control handle (10) is aligned with the first connecting hole (23) of the first adapter (20a), and the first locking piece (142) passes through the first through hole (141) to lock into the first connecting hole (23) of the first adapter (20a), thereby applying the control handle (10) to the first control valve (60a) with larger size. Furthermore, the relative position between the blocking portion (323) and the engaging rib (311) is changed by adjusting the engaging position between the first gear teeth (312) of the first sleeve (31) and the second gear teeth (321) of the locating piece (32). When the control handle (10) is rotated, the first adapter (20a) driven by the control handle (10) is configured to rotate the valve rod (61) so as to control water temperature and flow. Additionally, the first blocking rib (25) of the first adapter (20a) is adapted to block the blocking portion (323) of the locating piece (32) and the second blocking rib (451) of the first locating sleeve (45) such that the rotation angle of the control handle (10) is limited so as to prevent that water temperature is too high and water flow is too strong.

Figure 4:
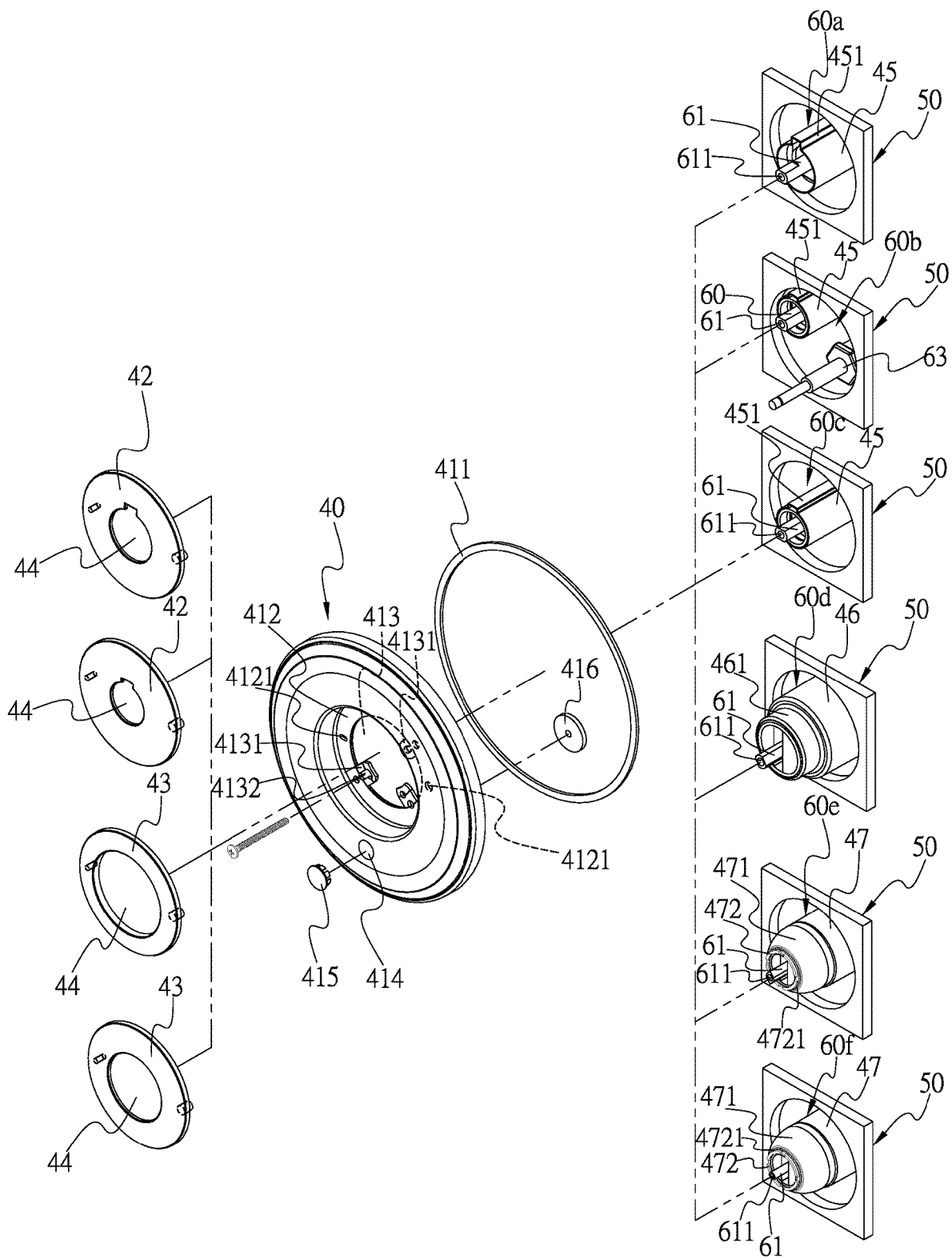
FIG. 4 is a schematic view illustrating a panel set of the wall-mounted faucet of the present invention is connected to different sizes of control valves through one of adjusting pieces.
Figure 5:
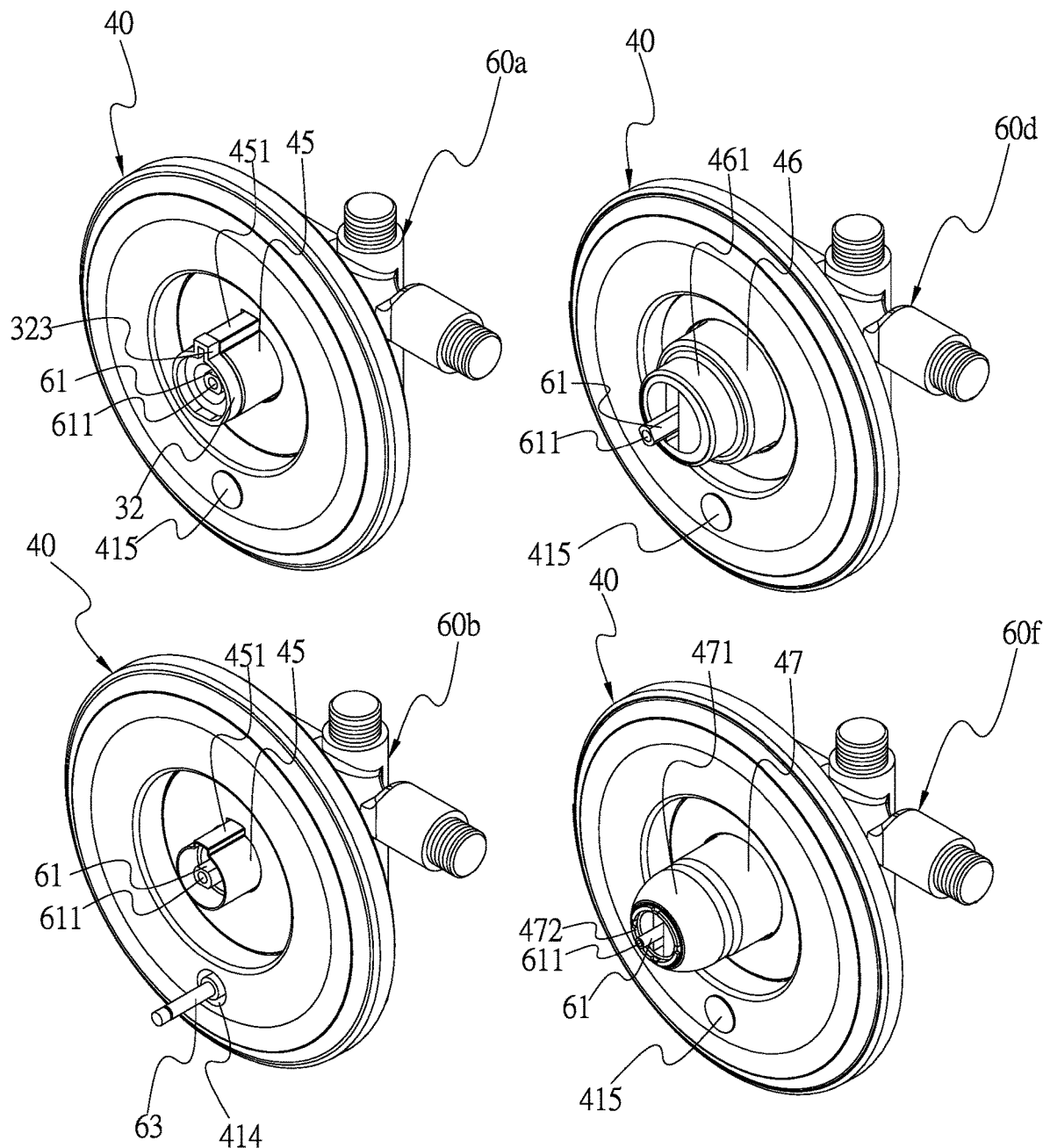
FIG. 5 is a schematic view illustrating the panel sets of the wall-mounted faucet of the present invention are respectively connected to different sizes of the control valves.
Figure 6:
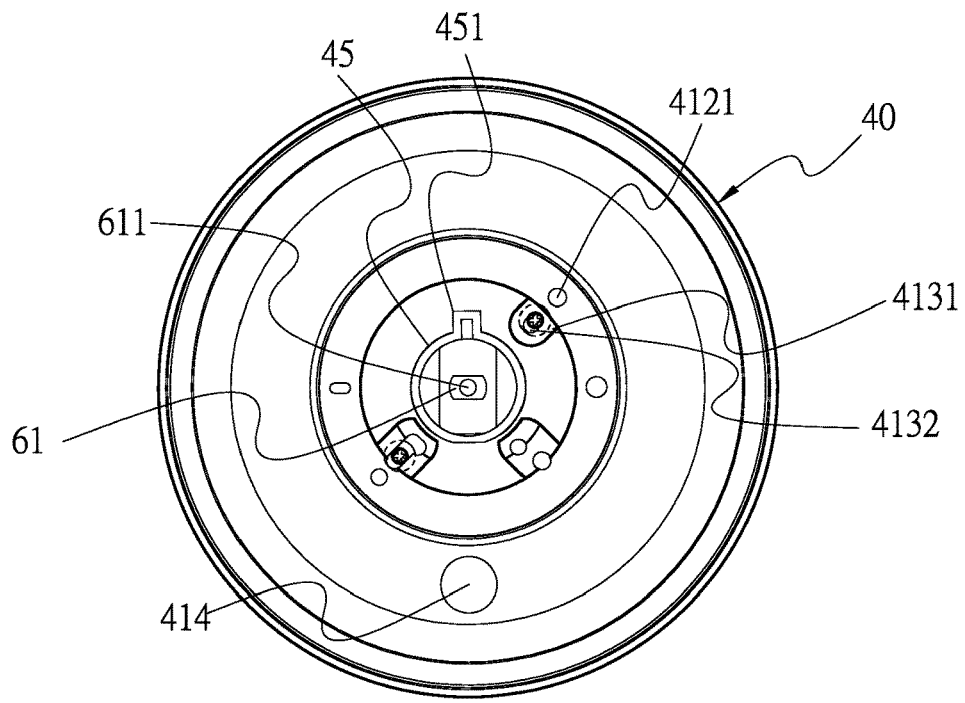
FIG. 6 is a schematic view illustrating two screws pass through two locking grooves of two locking boards which are located at diagonal positions to secure the position of the panel set of the wall-mounted faucet in the present invention.
Figure 7:
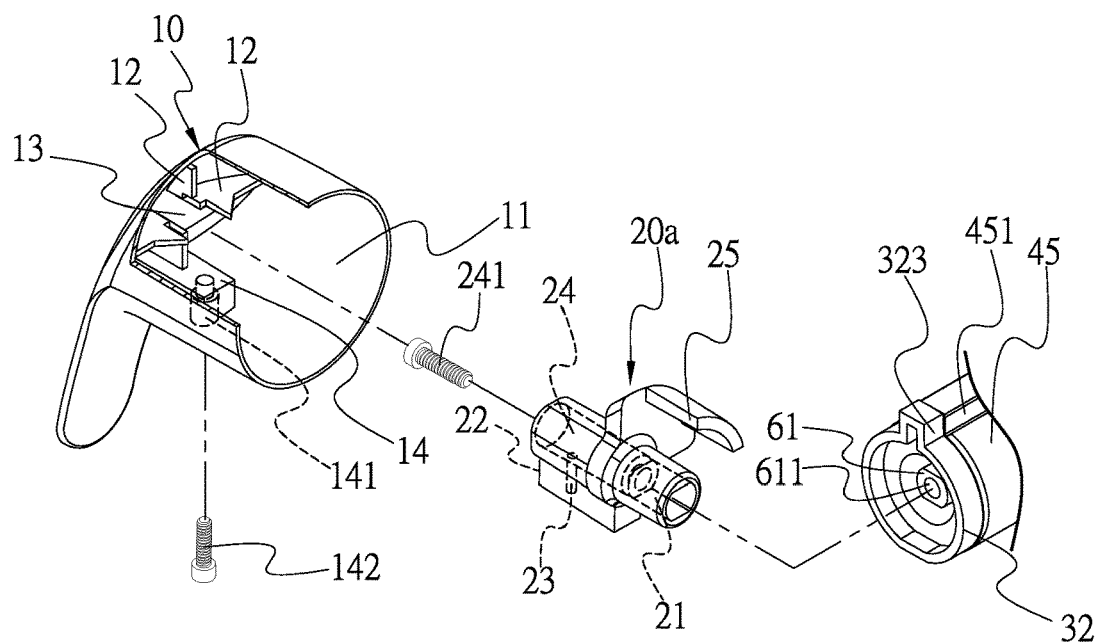
FIG. 7 is an exploded view illustrating a control handle is connected to a first adapter of the wall-mounted faucet of the present invention.
Figure 8:
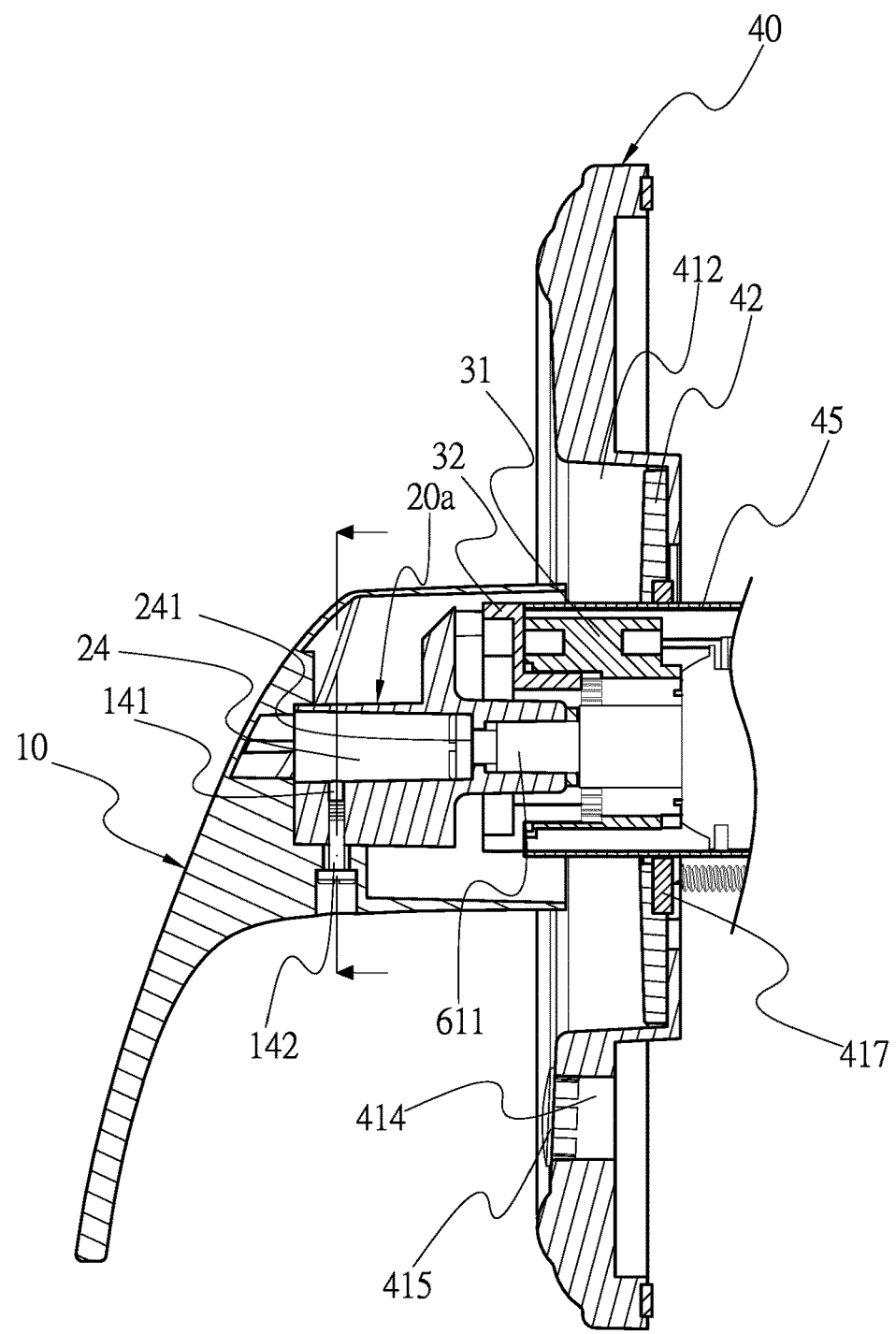
FIG. 8 is a schematic view illustrating the control handle is connected to the first adapter of the wall-mounted faucet of the present invention.
Figure 9:
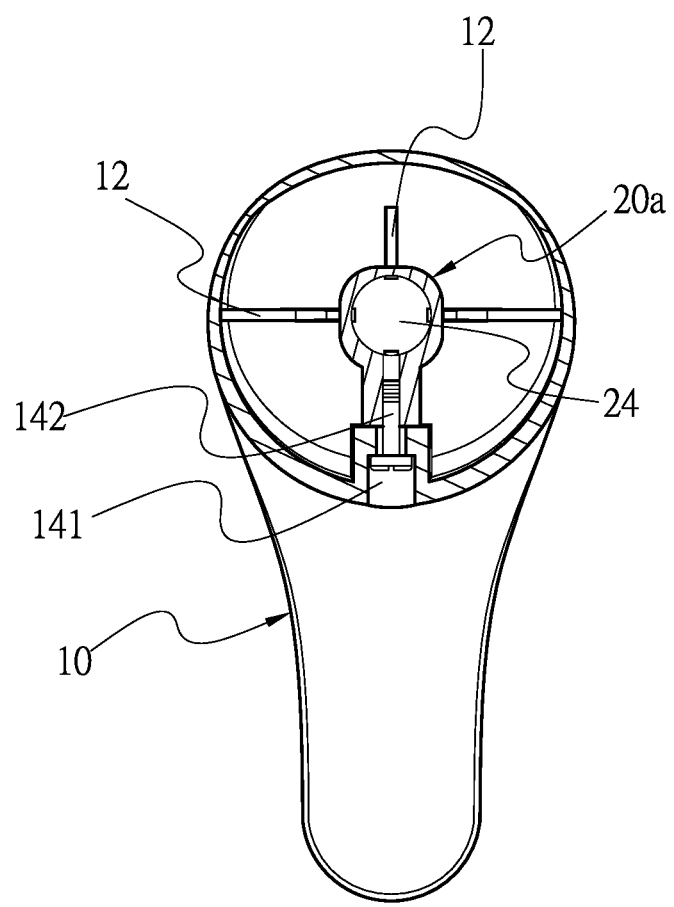
FIG. 9 is a sectional view illustrating the control handle is connected to the first adapter of the wall-mounted faucet of the present invention.
Figure 10:
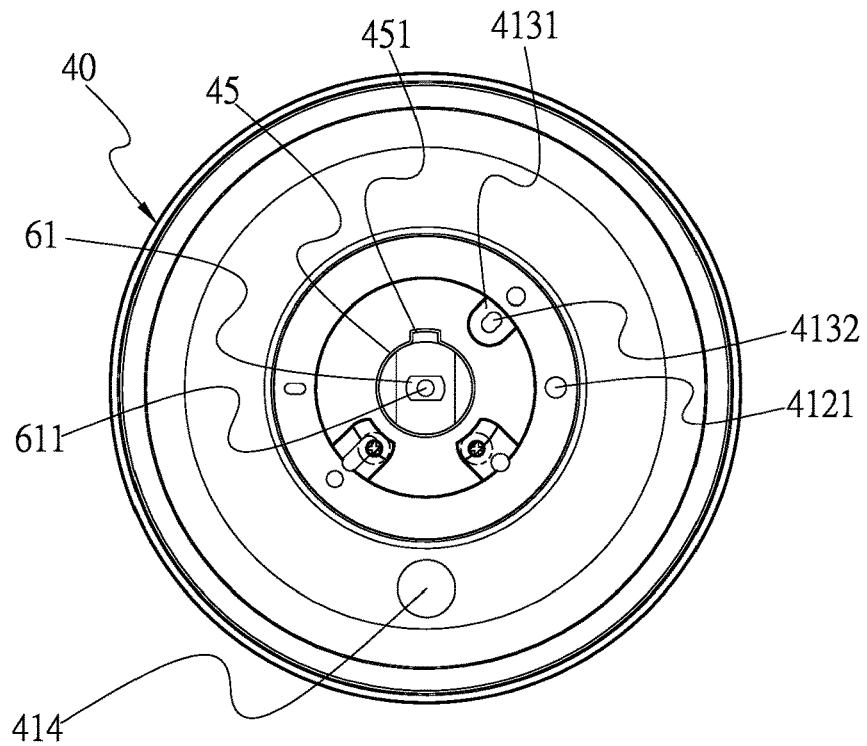
FIG. 10 is a schematic view illustrating two screws pass through the two locking grooves of the two locking boards which are located at adjacent positions to secure the position of the panel set of the wall-mounted faucet in the present invention.
Figure 11:
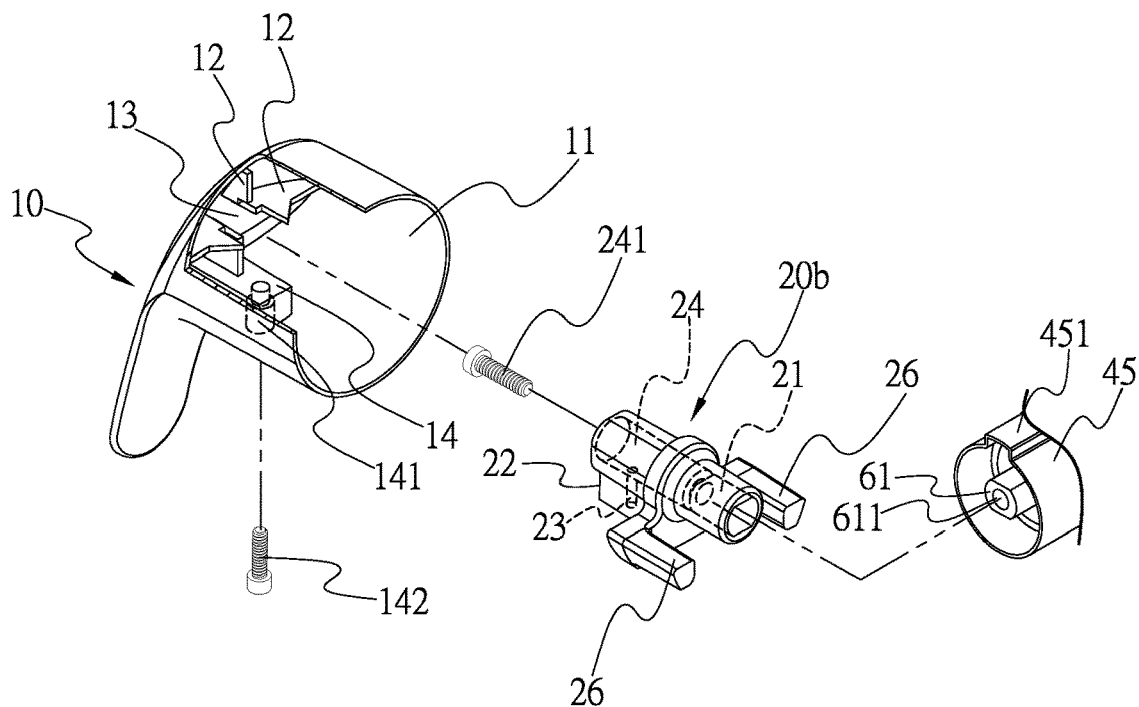
FIG. 11 is an exploded view illustrating the control handle is connected to a second adapter of the wall-mounted faucet of the present invention.
Figure 12:
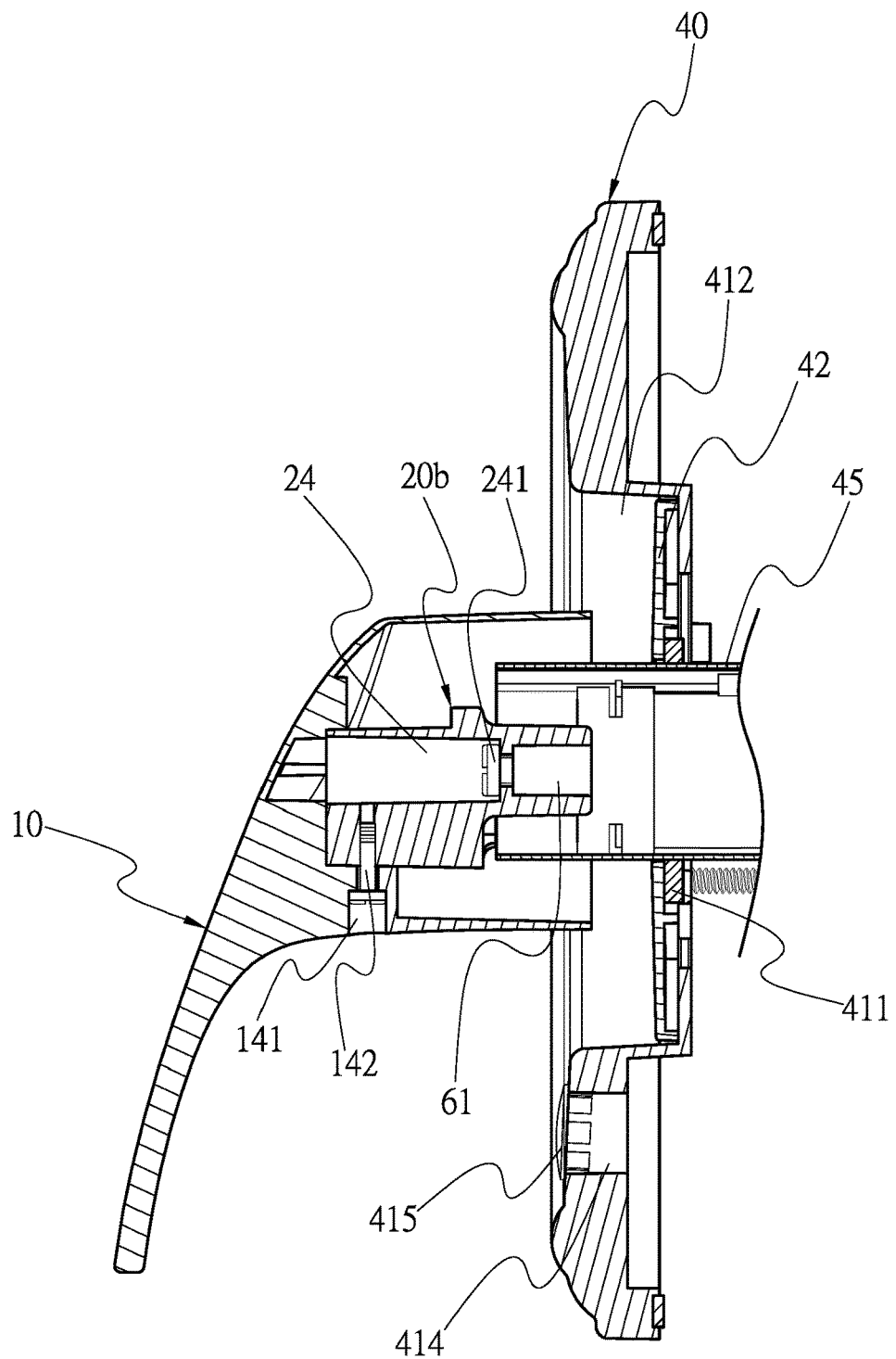
FIG. 12 is a schematic view illustrating the control handle is connected to the second adapter of the wall-mounted faucet of the present invention.
Figure 13:
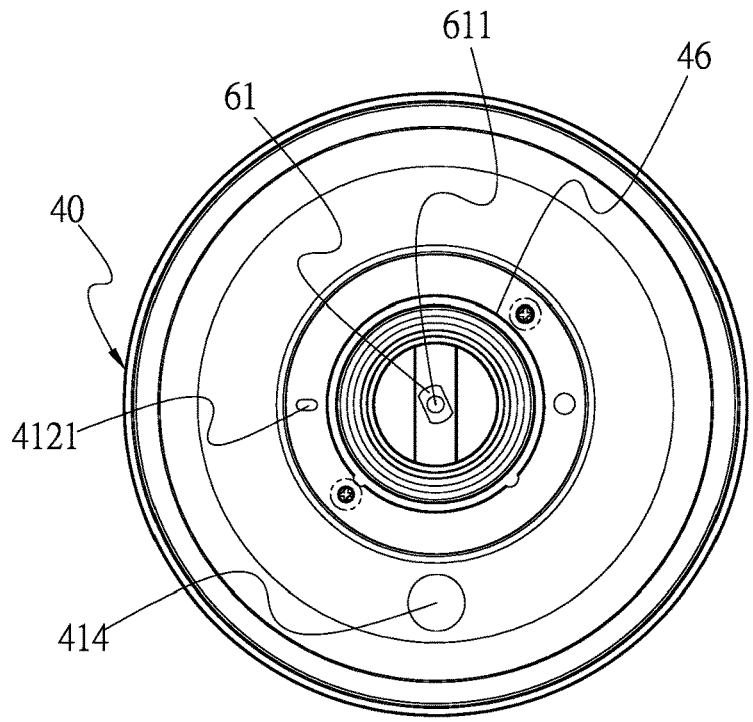
FIG. 13 is a schematic view illustrating two screws pass through two locking points of the panel set to secure the position of the panel set of the wall-mounted faucet in the present invention.
Figure 14:
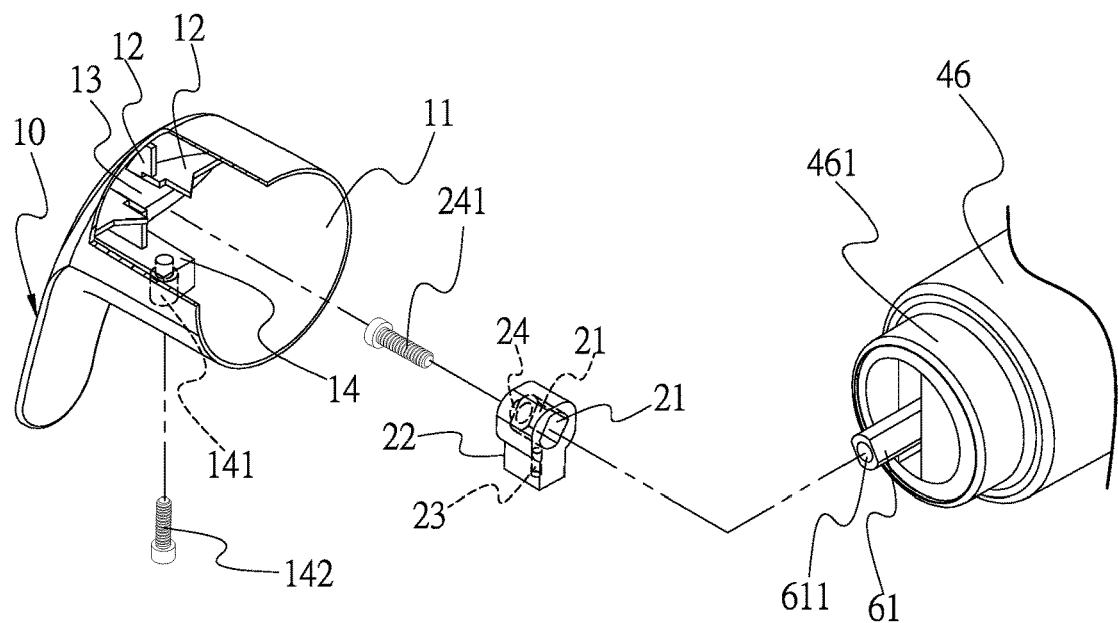
FIG. 14 is an exploded view illustrating the control handle is connected to a third adapter of the wall-mounted faucet of the present invention.
Figure 15:
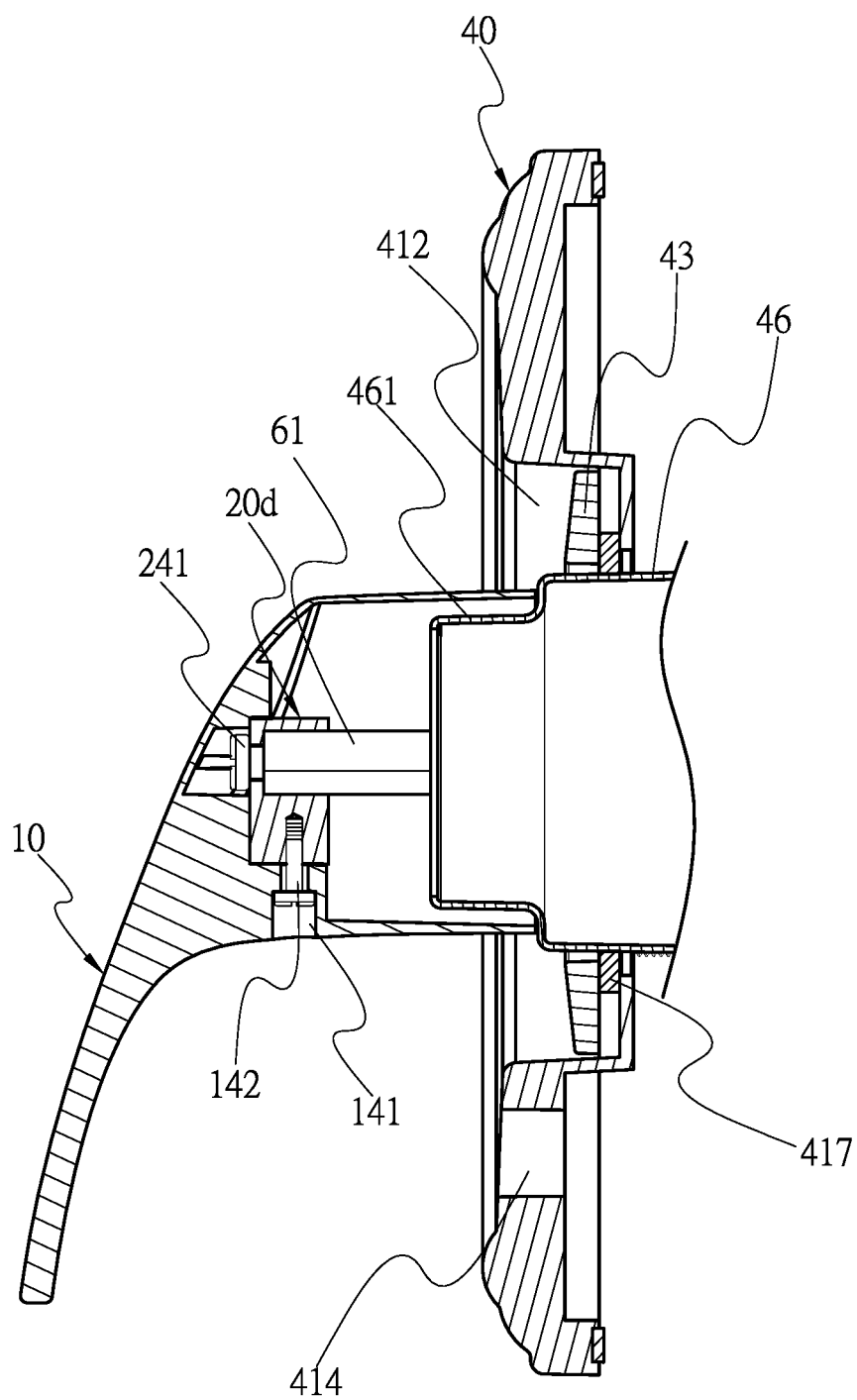
FIG. 15 is a schematic view illustrating the control handle is connected to the third adapter of the wall-mounted faucet of the present invention.
Figure 16:
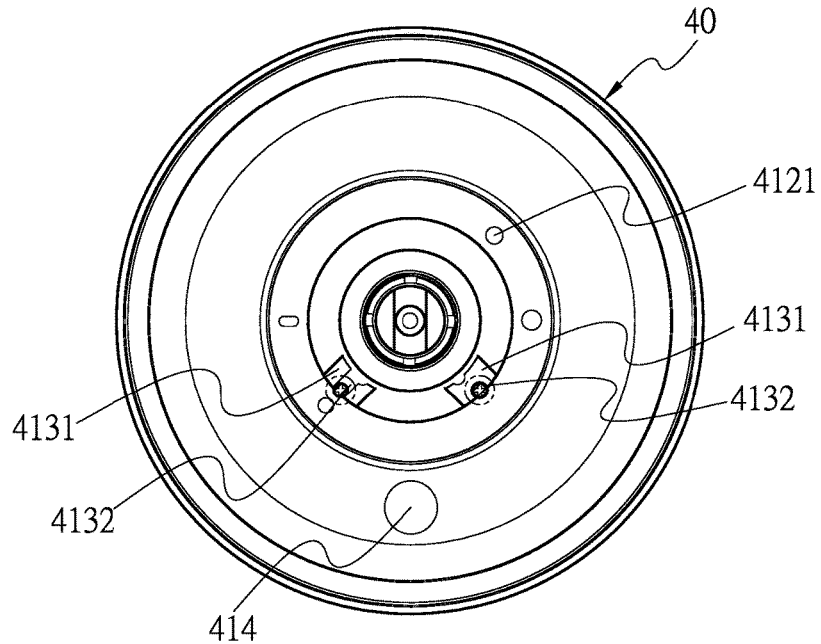
FIG. 16 is a schematic view illustrating the position of the panel set of the wall-mounted faucet in the present invention is secured through the locking boards which are located at adjacent positions.
Figure 17:
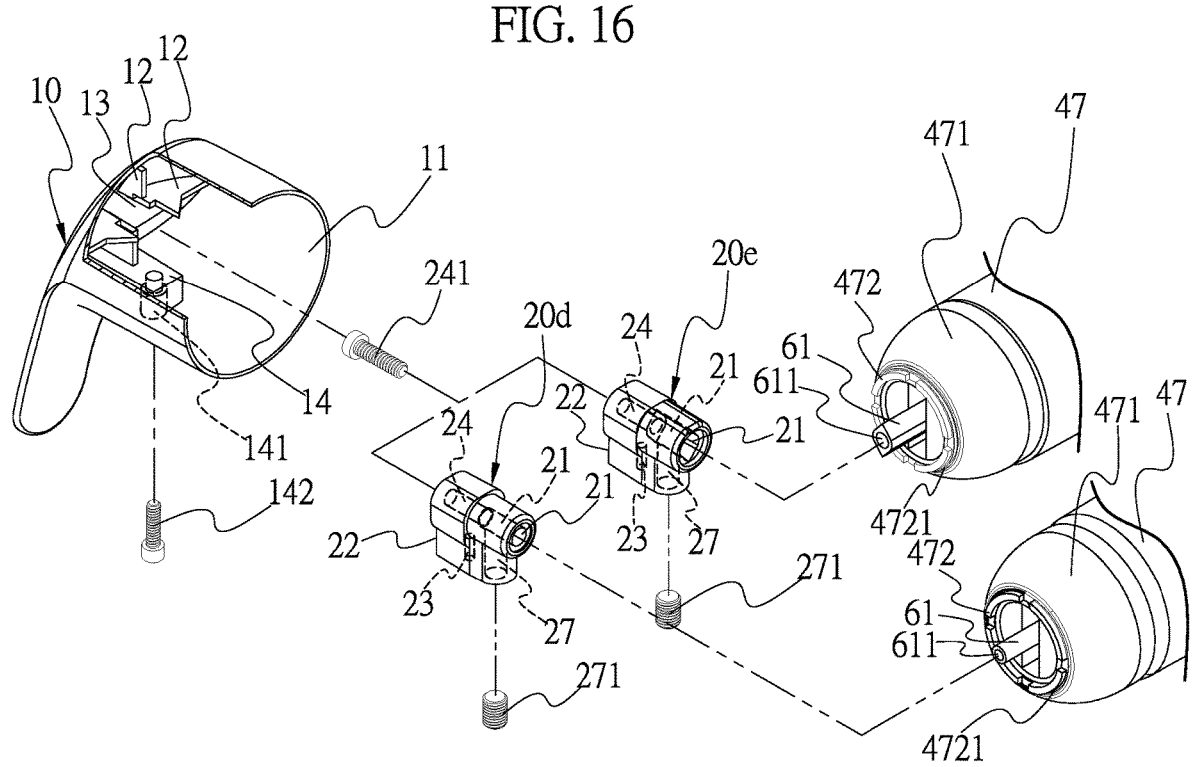
FIG. 17 is an exploded view illustrating the control handle is connected to a fourth adapter of the wall-mounted faucet of the present invention.
Figure 18:
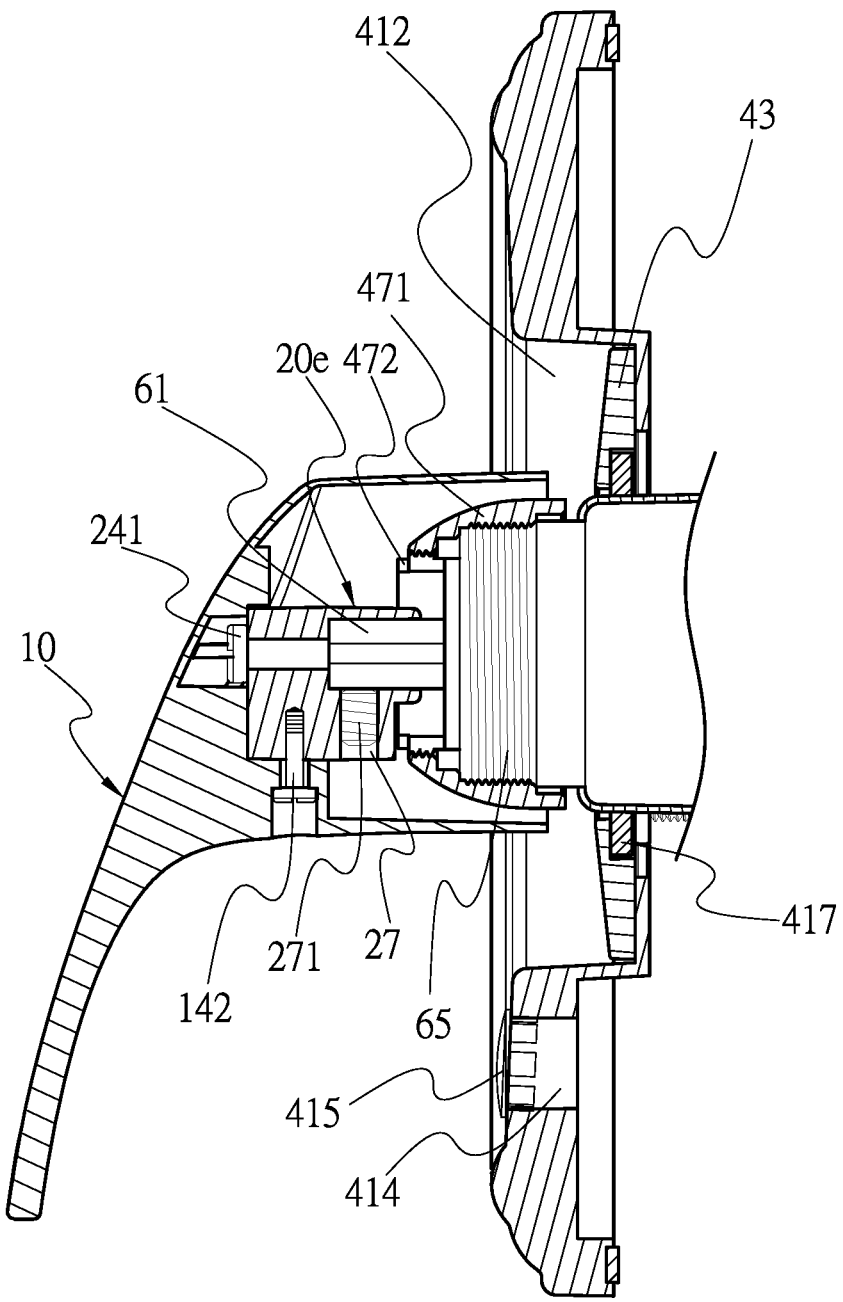
FIG. 18 is a schematic view illustrating the control handle is connected to the fourth adapter of the wall-mounted faucet of the present invention.

Referring to FIGS. 2, 4 and 5, when the control handle (10) is connected to the second control valve (60b), the first locating sleeve (45) with smaller size is disposed on the valve body of the second control valve (60b), and the second blocking rib (451) of the first locating sleeve (45) is engaged with the blocking protrude (62) of the second control valve (60b). Moreover, the cover (415) of the connecting panel (41) is detached from the third through hole (414) such that the switching rod (63) passes through and protrudes from the third through hole (414) while the hollow opening (413) of the connecting panel (41) is located around the second control valve (60b). Also, the first adjusting piece (42) with smaller size is connected to the receiving slot (412) of the connecting panel (41) such that the connecting panel (41) is applied to the second control valve (60b) with smaller size. Furthermore, the connecting panel (41) is mounted on the wall surface (50) through the locking points (4121) of the receiving slot (412) and/or the locating boards (4131) of the hollow opening (413) so as to complete the assembly of the panel set (40). In addition, the connecting slot (21) of the second adapter (20b) is disposed on the valve rod (61) of the second control valve (60b), and second locking piece (241) passes through the second through hole (24) to lock into the third connecting hole (611) of the second control valve (60b). Also, the spacing (11) of the control handle (10) is disposed on the second adapter (20b), and the first abutting surface (22) of the second adapter (20b) is slidably positioned in the engaging slot (13) of the control handle (10) to abut against the engaging boards (12). Moreover, the first through hole (141) of the connecting block (14) of the control handle (10) is aligned with the first connecting hole (23) of the second adapter (20b), and the first locking piece (142) passes through the first through hole (141) to lock into the first connecting hole (23) of the second adapter (20b), thereby applying the control handle (10) to the second control valve (60b) with smaller size. When the control handle (10) is rotated, the second adapter (20b) driven by the control handle (10) is configured to rotate the valve rod (61) so as to control water temperature and flow. Additionally, the blocking protrude (62) of the second control valve (60b) is adapted to provide blocking effect, and the rotation angle of the control handle (10) is limited when either of the two blocking columns (26) of the second adapter (20b) blocks the second blocking rib (451) of the first locating sleeve (45).

Referring to FIGS. 2, 4, 5, and 10 to 12, when the control handle (10) is connected to the third control valve (60c), the first locating sleeve (45) with smaller size is disposed on the valve body of the third control valve (60c), and the second blocking rib (451) of the first locating sleeve (45) is engaged with the blocking protrude (62) of the third control valve (60c). Moreover, the first gasket (411) is coupled with the connecting panel (41), and the hollow opening (413) of the connecting panel (41) is located around the third control valve (60c). Also, the smaller third gasket (417) and the smaller first adjusting piece (42) are connected to the receiving slot (412) of the connecting panel (41), so that the connecting panel (41) is applied to the first control valve (60c) with smaller size. Furthermore, the connecting panel (41) is mounted on the wall surface (50) through the locking points (4121) of the receiving slot (412) and/or the locating boards (4131) of the hollow opening (413) so as to complete the assembly of the panel set (40). In addition, the connecting slot (21) of the second adapter (20b) is disposed on the valve rod (61) of the third control valve (60c), and second locking piece (241) passes through the second through hole (24) to lock into the third connecting hole (611) of the third control valve (60c). Also, the spacing (11) of the control handle (10) is disposed on the second adapter (20b), and the first abutting surface (22) of the second adapter (20b) is slidably positioned in the engaging slot (13) of the control handle (10) to abut against the engaging boards (12). Moreover, the first through hole (141) of the connecting block (14) of the control handle (10) is aligned with the first connecting hole (23) of the second adapter (20b), and the first locking piece (142) passes through the first through hole (141) to lock into the first connecting hole (23) of the second adapter (20b), thereby applying the control handle (10) to the third control valve (60c) with smaller size. When the control handle (10) is rotated, the second adapter (20b) driven by the control handle (10) is configured to rotate the valve rod (61) so as to control water temperature and flow. Additionally, the blocking protrude (62) of the third control valve (60c) is adapted to provide blocking effect, and the rotation angle of the control handle (10) is limited when either of the two blocking columns (26) of the second adapter (20b) blocks the second blocking rib (451) of the first locating sleeve (45).

Referring to FIGS. 3 to 5 and 13 to 15, when the control handle (10) is connected to the fourth control valve (60d), the second locating sleeve (46) is disposed on the valve body of the fourth control valve (60d), and the first connecting section (461) of the second locating sleeve (46) is coupled with the second connecting section (64) of the fourth control valve (60d). Also, the connecting panel (41) is disposed on the outer periphery of the fourth control valve (60d) through the hollow opening (413), and the second adjusting piece (43) with larger size is connected to the receiving slot (412) of the connecting panel (41), so that the connecting panel (41) is applied to the fourth control valve (60d). Furthermore, the connecting panel (41) is mounted on the wall surface (50) through the locking points (4121) of the receiving slot (412) and/or the locating boards (4131) of the hollow opening (413) so as to complete the assembly of the panel set (40). In addition, the connecting slot (21) of the third adapter (20c) is disposed on the valve rod (61) of the fourth control valve (60d), and the second locking piece (241) passes through the second through hole (24) to lock into the third connecting hole (611) of the fourth control valve (60d). Also, the spacing (11) of the control handle (10) is disposed on the third adapter (20c), and the first abutting surface (22) of the third adapter (20c) is slidably positioned in the engaging slot (13) of the control handle (10) to abut against the engaging boards (12). Moreover, the first through hole (141) of the connecting block (14) of the control handle (10) is aligned with the first connecting hole (23) of the third adapter (20c), and the first locking piece (142) passes through the first through hole (141) to lock into the first connecting hole (23) of the third adapter (20c), thereby applying the control handle (10) to the fourth control valve (60d). When the control handle (10) is rotated, the third adapter (20c) driven by the control handle (10) is configured to rotate the valve rod (61) so as to control water temperature and flow.

Referring to FIGS. 3 to 5 and 16 to 18, when the control handle (10) is connected to the fifth control valve (60e), the third locating sleeve (47) is disposed on the valve body of the fifth control valve (60e), and the first inner thread (4711) of the first locking member (471) is engaged with the thread section (65) of the fifth control valve (60e). Moreover, the outer thread (4721) of the second locking member (472) is engaged with the second inner thread (4712) of the first locking member (471) so as to complete the assembly of the third locating sleeve (47). Also, the connecting panel (41) is disposed on the outer periphery of the fifth control valve (60e) through the hollow opening (413), and the second adjusting piece (43) with smaller size is connected to the receiving slot (412) of the connecting panel (41), so that the connecting panel (41) is applied to the fifth control valve (60e). Furthermore, the connecting panel (41) is mounted on the wall surface (50) through the locking points (4121) of the receiving slot (412) and/or the locating boards (4131) of the hollow opening (413) so as to complete the assembly of the panel set (40). In addition, the connecting slot (21) of the fourth adapter (20d) is disposed on the valve rod (61) of the fifth control valve (60e), and the second locking piece (241) passes through the second through hole (24) to lock into the third connecting hole (611) of the fifth control valve (60e). Also, the bolt (271) screwed into the locking hole (27) of the fourth adapter (20d) is adapted to abut against the valve rod (61) of the fifth control valve (60e). Additionally, the spacing (11) of the control handle (10) is disposed on the fourth adapter (20d), and the first abutting surface (22) of the fourth adapter (20d) is slidably positioned in the engaging slot (13) of the control handle (10) to abut against the engaging boards (12). Moreover, the first through hole (141) of the connecting block (14) of the control handle (10) is aligned with the first connecting hole (23) of the fourth adapter (20d), and the first locking piece (142) passes through the first through hole (141) to lock into the first connecting hole (23) of the fourth adapter (20d), thereby applying the control handle (10) to the fifth control valve (60e). When the control handle (10) is rotated, the fourth adapter (20d) driven by the control handle (10) is configured to rotate the valve rod (61) so as to control water temperature and flow.

Referring to FIGS. 3 to 5, and 16 to 18, when the control handle (10) is connected to the sixth control valve (60f), the third locating sleeve (47) is disposed on the valve body of the sixth control valve (60f), and the first inner thread (4711) of the first locking member (471) is engaged with the thread section (65) of the sixth control valve (60f). Moreover, the outer thread (4721) of the second locking member (472) is engaged with the second inner thread (4712) of the first locking member (471) so as to complete the assembly of the third locating sleeve (47). Also, the connecting panel (41) is disposed on the outer periphery of the sixth control valve (60f) through the hollow opening (413), and the second adjusting piece (43) with smaller size is connected to the receiving slot (412) of the connecting panel (41), so that the connecting panel (41) is applied to the sixth control valve (60f). Furthermore, the connecting panel (41) is mounted on the wall surface (50) through the locking points (4121) of the receiving slot (412) and/or the locating boards (4131) of the hollow opening (413) so as to complete the assembly of the panel set (40). In addition, the connecting slot (21) of the fifth adapter (20e) is disposed on the valve rod (61) of the sixth control valve (60f), and the second locking piece (241) passes through the second through hole (24) to lock into the third connecting hole (611) of the sixth control valve (60f). Also, the bolt (271) screwed into the locking hole (27) of the fifth adapter (20e) is adapted to abut against the valve rod (61) of the sixth control valve (60f). Additionally, the spacing (11) of the control handle (10) is disposed on the fifth adapter (20e), and the first abutting surface (22) of the fifth adapter (20e) is slidably positioned in the engaging slot (13) of the control handle (10) to abut against the engaging boards (12). Moreover, the first through hole (141) of the connecting block (14) of the control handle (10) is aligned with the first connecting hole (23) of the fifth adapter (20e), and the first locking piece (142) passes through the first through hole (141) to lock into the first connecting hole (23) of the fifth adapter (20e), thereby applying the control handle (10) to the sixth control valve (60f). When the control handle (10) is rotated, the fifth adapter (20e) driven by the control handle (10) is configured to rotate the valve rod (61) so as to control water temperature and flow.

Comparing with conventional wall-mounted faucet, the present invention is advantageous because: the wall-mounted faucet of the present invention can be applied to different sizes of the control valves through selecting the adapters (20a)(20b)(20c)(20d)(20e), the adjusting pieces (42)(43), and the locating sleeves (45)(46)(47), and also the panel set (40) has the locking points (4121) and the locking boards (4131), which increases the convenience for assembly.

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. A wall-mounted faucet comprising a control handle, a first adapter, a second adapter, a third adapter, a fourth adapter, a fifth adapter, a positioning member, and a panel set;
   wherein a lateral side of the control handle is concaved to form a spacing therein, and four engaging boards are respectively extended from the center of the spacing toward four directions to form an engaging slot; a connecting block having a first through hole thereon protrudes from an inner periphery of the spacing, and a first locking piece is screwed into the first through hole;
   wherein one of the first adapter, the second adapter, the third adapter, the fourth adapter, and the fifth adapter, is selected to position into the spacing of the control handle, and each of the five adapters comprises a connecting slot at a rear end thereof while a front end thereof has a first abutting surface, and each of the five adapters has a first connecting hole at a bottom portion thereof adjacent to the first abutting surface; the first abutting surface comprises a second through hole thereon which is communicated with the connecting slot, and a second locking piece is screwed into the second through hole; the first adapter comprises a wing portion protruding from a middle portion of the first adapter, and a first blocking rib is extendedly formed from the wing portion near the top of the connecting slot, and the connecting slot is adapted to receive a washer; the second adapter has two wing portions respectively protruding from two lateral lower portions of a middle portion of the second adapter, and two blocking columns are extendedly formed from the two wing portions respectively on both sides of the connecting slot at corresponding positions; each of the fourth adapter and the fifth adapter has a locking hole under the connecting slot, and a bolt is screwed into the locking hole; an inner periphery of the connecting slot of the fourth adapter has a circular cross section, and an inner periphery of the connecting slot of the fifth adapter has a polygonal cross section while an outer periphery thereof has a plane on the top thereof;

wherein the positioning member has a first sleeve and a locating piece, and an engaging rib protrudes from an outer periphery of the first sleeve while an inner periphery of the first sleeve has a first gear teeth, and a front end of the first sleeve comprises an abutting board; a second gear teeth formed on an outer periphery of a rear end of the locating piece is adapted to engage with the first gear teeth of the first sleeve; a front end of the locating piece is expanded to form a second abutting surface which is configured to abut against an opening of the front end of the first sleeve; a blocking portion protruding from an edge of the second abutting surface is adapted to abut against the first blocking rib of the first adapter; and wherein the panel set comprises a connecting panel, a first adjusting piece, and a second adjusting piece, and the connecting panel is configured to connect to a wall surface, and a first gasket is coupled therebetween to connect the connecting panel to the wall surface tightly; a receiving slot is concavely formed at a front end of the connecting panel, and a bottom surface of the receiving slot has a hollow opening, and a plurality of locking points are formed on the bottom surface around the hollow opening; a plurality of locking boards respectively protrude from an inner periphery of the hollow opening, and each of the locking boards has at least a locking groove formed thereon; the locations of the locking points and the locking boards are arranged according to the size of a control valve of the wall-mounted faucet; the connecting panel comprises a third through hole formed near an outer periphery of the connecting panel, and both sides of the third through hole respectively have a cover and a second gasket; one of the first adjusting piece and the second adjusting piece is selected to connect to the receiving slot of the connecting panel, and a third gasket is coupled therebetween to assure tight sealing; each of the first adjusting piece and the second adjusting piece comprises a second connecting hole which is configured to be penetrated through by the valve body of the control valve, and the second connecting hole is different in size for the first adjusting piece and the second adjusting piece so as to fit different sizes of the control valves; the second connecting hole of the first adjusting piece is adapted to selectively couple with one of two different hole-sizes of first locating sleeves, and each of the first locating sleeves has an axial second blocking rib protruding from an outer periphery thereof; the second connecting hole of the second adjusting piece is configured to selectively couple with one of a second locating sleeve and a third locating sleeve, and the second locating sleeve has a first connecting section at an end thereof, and the third locating sleeve comprises a first locking member and a second locking member; a first inner thread and a second inner thread are formed on an inner periphery of the first locking member respectively at two different sections thereof, and an outer periphery of the second locking member comprises an outer thread; and one of the first locating sleeves, the second locating sleeve, and the third locating sleeve is selected to connect to the valve body of the control valve.

2. The wall-mounted faucet of claim 1, wherein the control valve has a valve rod protruding therefrom, and a third connecting hole is formed on the valve rod.

3. The wall-mounted faucet of claim 2, wherein the valve rod of the control valve has two planes on an outer periphery thereof at corresponding positions.

4. The wall-mounted faucet of claim 2, wherein the valve rod of the control valve has a polygonal cross section.

5. The wall-mounted faucet of claim 2, wherein the valve rod of the control valve has a circular cross section.

6. The wall-mounted faucet of claim 1, wherein the control valve comprises an axial blocking protrude on an outer periphery thereof.

7. The wall-mounted faucet of claim 1, wherein the control valve has a switching rod protrudingly formed under the valve rod.

8. The wall-mounted faucet of claim 1, wherein the control valve comprises a second connecting section at an outer end thereof.

9. The wall-mounted faucet of claim 8, wherein the control valve has a thread section on an outer periphery thereof near the second connecting section.

\* \* \* \* \*